(12) United States Patent
Chi

(10) Patent No.: US 7,362,337 B2
(45) Date of Patent: Apr. 22, 2008

(54) METHOD AND APPARATUS FOR ADJUSTING SIZE OF IMAGE

(75) Inventor: Fu-Chung Chi, Taipei (TW)

(73) Assignee: Ali Corporation, Taipei (TW)

( * ) Notice: Subject to any disclaimer, the term of this patent is extended or adjusted under 35 U.S.C. 154(b) by 155 days.

(21) Appl. No.: 11/392,702

(22) Filed: Mar. 30, 2006

(65) Prior Publication Data

US 2007/0058857 A1    Mar. 15, 2007

(30) Foreign Application Priority Data

Sep. 14, 2005   (TW) .............................. 94131577 A

(51) Int. Cl.
| | |
|---|---|
| *G09G 5/00* | (2006.01) |
| *G09G 5/36* | (2006.01) |
| *G06K 9/00* | (2006.01) |
| *H04N 11/22* | (2006.01) |
| *H04N 5/445* | (2006.01) |
| *H04N 11/08* | (2006.01) |
| *H04N 9/08* | (2006.01) |
| *G06K 1/60* | (2006.01) |

(52) U.S. Cl. ...................... 345/589; 345/606; 345/643; 345/547; 345/560; 348/456; 348/490; 348/567; 348/715; 382/162; 382/166; 382/300; 382/305; 358/518; 358/524; 358/525

(58) Field of Classification Search ................ 345/589, 345/600, 643–644, 544–549, 555, 560, 660; 348/435, 439, 456–459, 490–492, 496, 580, 348/566–568, 715–717, 721, 239; 382/162–167; 358/518–519, 523–525, 537–538

See application file for complete search history.

(56) References Cited

U.S. PATENT DOCUMENTS

| | | | | |
|---|---|---|---|---|
| 6,844,896 | B2 * | 1/2005 | Henderson et al. | 348/241 |
| 2002/0012055 | A1 * | 1/2002 | Koshiba et al. | 348/273 |
| 2002/0015447 | A1 * | 2/2002 | Zhou | 375/240.25 |
| 2002/0027604 | A1 * | 3/2002 | Hung | 348/239 |
| 2002/0101524 | A1 * | 8/2002 | Acharya | 348/273 |

\* cited by examiner

*Primary Examiner*—Wesner Sajous
(74) *Attorney, Agent, or Firm*—Birch, Stewart, Kolasch & Bicrh, LLP

(57) ABSTRACT

A method for transforming an original image to a new image is provided. The original image includes M rows of original data; the new image includes Q rows of new data. The method first generates a (2i−1)th row and a (2i)th row of intermediate data respectively based on the (2i−1)th row and the (2i)th row of original data. Then, the method generates a (2i+1)th row and a (2i+2)th row of intermediate data respectively based on the (2i+1)th row and the (2i+2)th row of original data. During the process of generating the (2i+1)th row of intermediate data, the (2j−1)th row of new data is simultaneously generated based on the (2i−1)th row and the (2i+1)th row of intermediate data. During the process of generating the (2i+2)th row of intermediate data, the (2j)th row of new data is simultaneously generated based on the (2i)th row and the (2i+2)th row of intermediate data.

18 Claims, 4 Drawing Sheets

(2N) original data

| R | G | R | G | R | G | R | G |
|---|---|---|---|---|---|---|---|
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |

M rows

FIG. 1 (A)

(2P) new data

| R" | G" | R" | G" |
|---|---|---|---|
| G" | B" | G" | B" |
| R" | G" | R" | G" |
| G" | B" | G" | B" |

Q rows

FIG. 1 (B)

METHOD AND APPARATUS FOR ADJUSTING SIZE OF IMAGE

BACKGROUND OF THE INVENTION

1. Field of the Invention

This invention is related to methods and apparatuses for processing images. More specifically, this invention is related to methods and apparatuses for adjusting the size of an image.

2. Description of the Prior Art

With the rapid development of consumer electrical products, webcams have become basic equipment for remote communications, and the functions provided by a webcam are more and more diversified. Many image processing procedures, for example, resizing and edge enhancing, are now integrated into webcams.

In prior arts, general image resizing methods and apparatuses transform images conformed to Bayer patterns into data in a RGB or YUV plane before resizing the images. Although the requirement on image qualities for webcams is lower than that for digital cameras or digital video recorders, a real-time speed of displaying images is more demanding for webcams. Because most image resizing methods and apparatuses in prior arts are very complicated, delays often occur when the images outputted by a webcam are displayed. Besides, prior arts have to use a DRAM for temporarily storing a whole image during the procedure of resizing the image. The cost of a DRAM inevitably increases the price of a webcam.

Furthermore, some image resizing techniques in prior arts divide an image into a plurality of blocks with the same sizes, for example, blocks with sizes equal to 8×8 or 14×14, before performing resizing procedure. The dividing procedure causes block effects in resized images.

SUMMARY OF THE INVENTION

To solve aforementioned problems, this invention provides a method and an apparatus for transforming an original image into a new image. The original image and the new image are both conformed to a Bayer pattern. The method and apparatus according to this invention resize images conformed to Bayer patterns before transforming images into data in a RGB or YUV plane. Thus, the amount of data to be processed can be reduced to one third as that of prior arts.

In this invention, the original image includes M rows of original data, and the new image includes Q rows of new data, wherein M and Q are positive integers larger than or equal to 1. Besides, a memory is previously provided. A first index i is larger than or equal to 1 and smaller than or equal to (M/2−1). A second index j is larger than or equal to 1 and smaller than or equal to (Q/2).

One preferred embodiment according to this invention is an image processing method. The method first generates a (2i−1)th row of intermediate data based on the (2i−1)th row of original data among the M rows of original data, and then stores the (2i−1)th row of intermediate data into the memory. Next, a (2i)th row of intermediate data is generated based on the (2i)th row of original data among the M rows of original data. The (2i)th row of intermediate data is also stored into the memory. Subsequently, a (2i+1)th row of intermediate data is generated based on the (2i+1)th row of original data among the M rows of original data. During the process of generating the (2i+1)th row of intermediate data, the (2j−1)th row of new data among the Q rows of new data is simultaneously generated based on the (2i−1)th and (2i+1)th rows of intermediate data. Then, the (2i+1)th row of intermediate data is stored into the memory to replace the (2i−1)th row of intermediate data. Afterward, a (2i+2)th row of intermediate data is generated based on the (2i+2)th row of original data among the M rows of original data. During the process of generating the (2i+2)th row of intermediate data, the (2j)th row of new data among the Q rows of new data is simultaneously generated based on the (2i)th and (2i+2)th rows of intermediate data. The (2i+2)th row of intermediate data is stored into the memory to replace the (2i)th row of intermediate data.

The other preferred embodiment according to this invention is an image processing apparatus including a memory, a horizontal processing module, and a vertical processing module. The horizontal processing module sequentially generates a (2i−1)th row of intermediate data based on the (2i−1)th row of original data among the M rows of original data, stores the (2i−1)th row of intermediate data into the memory, generates a (2i)th row of intermediate data based on the (2i)th row of original data among the M rows of original data, stores the (2i)th row of intermediate data into the memory, generates a (2i+1)th row of intermediate data based on the (2i+1)th row of original data among the M rows of original data, stores the (2i+1)th row of intermediate data into the memory to replace the (2i−1)th row of intermediate data, generates a (2i+2)th row of intermediate data based on the (2i+2)th row of original data among the M rows of original data, and stores the (2i+2)th row of intermediate data into the memory to replace the (2i)th row of intermediate data. During the process of generating the (2i+1)th row of intermediate data in the horizontal processing module, the vertical processing module simultaneously generates the (2j−1)th row of new data among the Q rows of new data based on the (2i−1)th and (2i+1)th rows of intermediate data. Similarly, during the process of generating the (2i+2)th row of intermediate data in the horizontal processing module, the vertical processing module simultaneously generates the (2j)th row of new data among the Q rows of new data based on the (2i)th and (2i+2)th rows of intermediate data.

The method and apparatus according to this invention use serial interfaces to input the original image and output the new image, respectively. That is to say, the original image is processed row by row. Thus, this invention only needs a memory space enough for storing a few rows of original data. On the contrary, prior arts need a memory space enough for storing the whole original image. Therefore, the cost of hardware in this invention is lower. Besides, since this invention processes the original data row by row, block effect can be prevented.

The advantage and spirit of the invention may be understood by the following recitations together with the appended drawings.

BRIEF DESCRIPTION OF THE APPENDED DRAWINGS

FIG. 1 (A) shows an example of the original image and FIG. 1 (B) shows an example of the new image.

DETAILED DESCRIPTION OF THE INVENTION

This invention provides a method and an apparatus for transforming an original image into a new image. The original image and the new image are both conformed to a Bayer pattern. Please refer to FIG. 1. FIG. 1 (A) shows an example of the original image and FIG. 1 (B) shows an example of the new image. The original image includes M rows and (2N) columns of original data. The new image includes Q rows and (2P) columns of new data. In this example, M is equal to 8, N is equal to 4, Q is equal to 4, and P is equal to 2. That is to say, the original image is reduced to a smaller new image with half length and half width.

As shown in FIG. 1, each odd row among the M rows of original data respectively includes N first color units (R) and N second color units (G), and each even row among the M rows of original data respectively includes N second color units (G) and N third color units (B). Each odd row among the Q rows of new data respectively includes P new first color units (R") and P new second color units (G"), and each even row among the Q rows of new data respectively includes P new second color units (G") and P new third color units (B"). The aforementioned arrangement of color units are conformed to a Bayer pattern.

In this invention, a memory, (for example, SRAM) is previously provided. A first index i is larger than or equal to 1 and smaller than or equal to (M/2−1). A second index j is larger than or equal to 1 and smaller than or equal to (Q/2).

Figure 2:
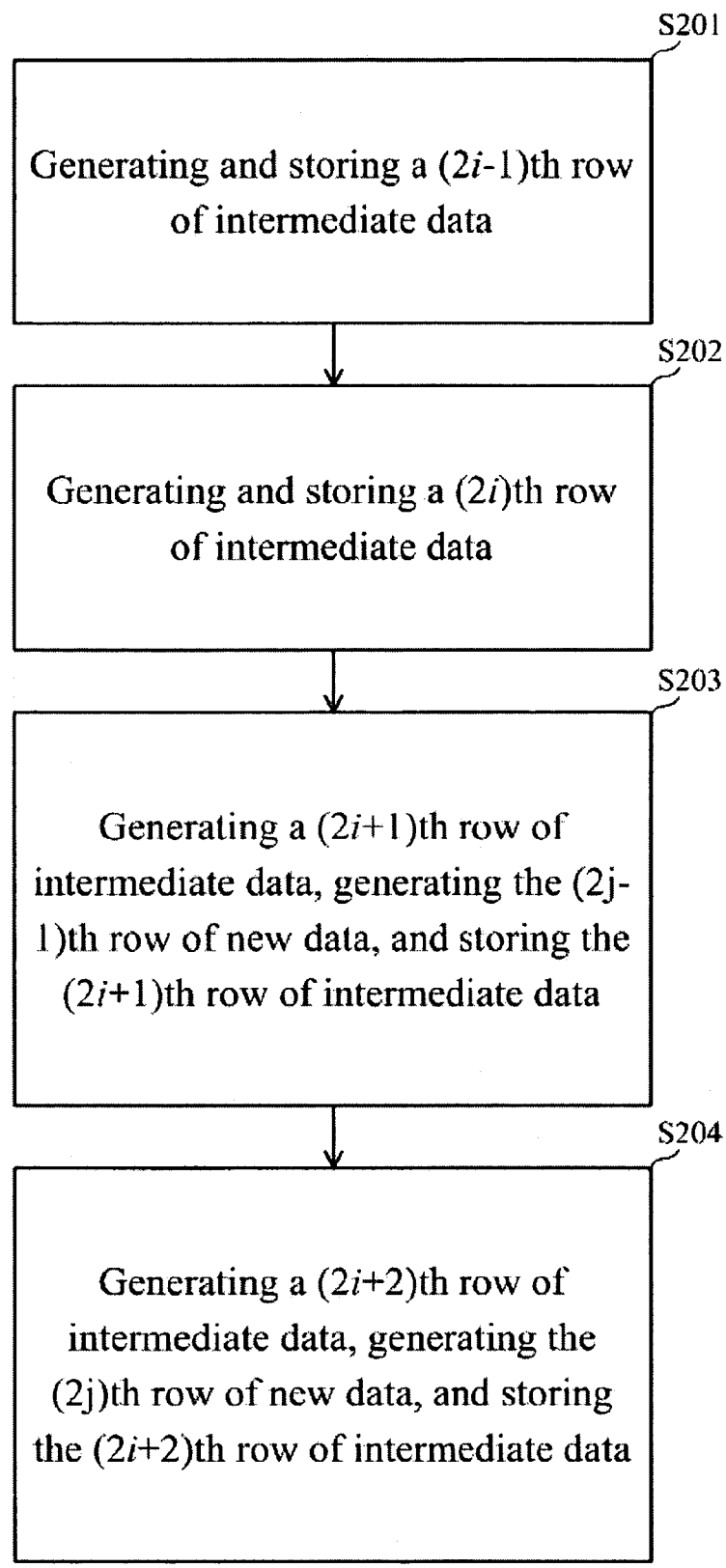
FIG. 2 shows the flowchart of the image processing method according to the first preferred embodiment of this invention.

Please refer to FIG. 2. FIG. 2 shows the flowchart of the image processing method according to the first preferred embodiment of this invention. The method sequentially processes one row of original data each time. Accordingly, step S21 first generating a (2i−1)th row of intermediate data based on the (2i−1)th row of original data among the M rows of original data by interpolation. The (2i−1)th row of intermediate data is then stored into the memory. Step S202 is generating a (2i)th row of intermediate data based on the (2i)th row of original data among the M rows of original data by interpolation. The (2i)th row of intermediate data is then stored into the memory. Step S203 is generating a (2i+1)th row of intermediate data based on the (2i+1)th row of original data among the M rows of original data. During the process of generating the (2i+1)th row of intermediate data, the (2j−1)th row of new data among the Q rows of new data is simultaneously generated based on the (2i−1)th and (2i+1)th rows of intermediate data by interpolation. The (2i+1)th row of intermediate data is then stored into the memory to replace the (2i−1)th row of intermediate data. Step S204 is generating a (2i+2)th row of intermediate data based on the (2i+2)th row of original data among the M rows of original data. During the process of generating the (2i+2)th row of intermediate data, the (2j)th row of new data among the Q rows of new data is simultaneously generated based on the (2i)th and (2i+2)th rows of intermediate data. The (2i+2)th row of intermediate data is then stored into the memory to replace the (2i)th row of intermediate data. In this way, the Q rows of new data in the new image are sequentially generated and the original image is transformed into the new image.

Figure 3:
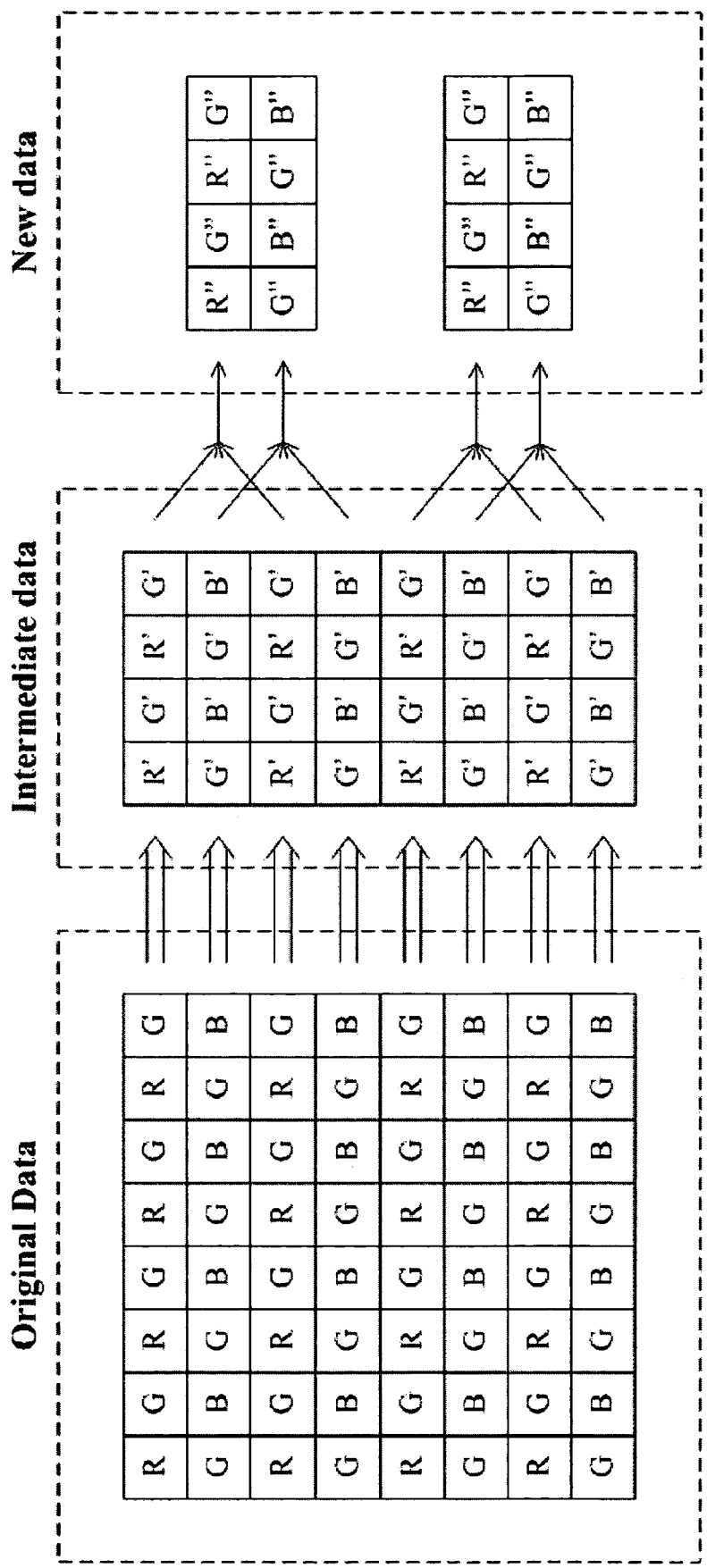
FIG. 3 shows the relation between the original data, intermediate data, and the new data.

The detailed procedures of the steps are described thereafter. Please refer to FIG. 3. FIG. 3 shows the relation between the original data, intermediate data, and the new data. This invention processes one row of original data each time. Thus, step S201 is first performed to horizontally reduce the first row of original data in the original image. In actual applications, this invention can generate the P intermediate first color units (R') in the first row of intermediate data based on the N first color units (R) in the first row of original data by interpolation. Similarly, the P intermediate second color units (G') in the first row of intermediate data are generated based on the N second color units (G') in the first row of original data. Subsequently, the first row of intermediate data is stored into the memory.

Step S202 is then performed to horizontally reduce the second row of original data in the original image. In actual applications, this invention can generate the P intermediate second color units (G') in the second row of intermediate data based on the N second color units (G) in the second row of original data by interpolation. Similarly, the P intermediate third color units (B) in the second row of intermediate data are generated based on the N third color units (B') in the second row of original data. Subsequently, the second row of intermediate data is stored into the memory.

Step S203 generates the third row of intermediate data in a similar way. During the process of generating the third row of intermediate data, this invention simultaneously starts to perform a vertically reduction. The first row of new data among the Q rows of new data is generated by interpolation based on the third row of intermediate data just being generated and the first row of intermediate data stored in the memory. The third row of intermediate data is then stored into the memory to replace the first row of intermediate data. More specifically, the P new first color units (R") in the first row of new data are generated based on the P intermediate first color units (R') in the first row of intermediate data and the P intermediate first color units (R') in the third row of intermediate data. Similarly, the P new second color units (G") in the first row of new data are generated based on the P intermediate second color units (G') in the first row of intermediate data and the P intermediate second color units (G') in the third row of intermediate data.

Step S204 first generates the fourth row of intermediate data. During the process of generating the fourth row of intermediate data, this invention also simultaneously starts to perform a vertically reduction. The second row of new data among the Q rows of new data is generated by interpolation based on the fourth row of intermediate data just being generated and the second row of intermediate data stored in the memory. The fourth row of intermediate data is then stored into the memory to replace the second row of intermediate data. More specifically, the P new second color units (G") in the second row of new data are generated based on the P intermediate second color units (G') in the second row of intermediate data and the P intermediate second color units (G') in the fourth row of intermediate data. Similarly, the P new third color units (B") in the second row of new data are generated based on the P intermediate third color units (B') in the second row of intermediate data and the P intermediate third color units (B') in the fourth row of intermediate data.

According to the flowchart shown in FIG. 2, the Q rows of new data in the new image are sequentially generated and the original image is transformed into the new image.

Except the aforementioned example of reducing the size of an image, this invention can also be applied in conditions of enlarging the size of an image. The procedure for enlarging the size of an image is almost the same as the aforementioned steps. The only difference is the number of data generated by interpolation. To generate an image with a larger size, the number of data to be generated by interpolation should be increased correspondingly.

Figure 4:
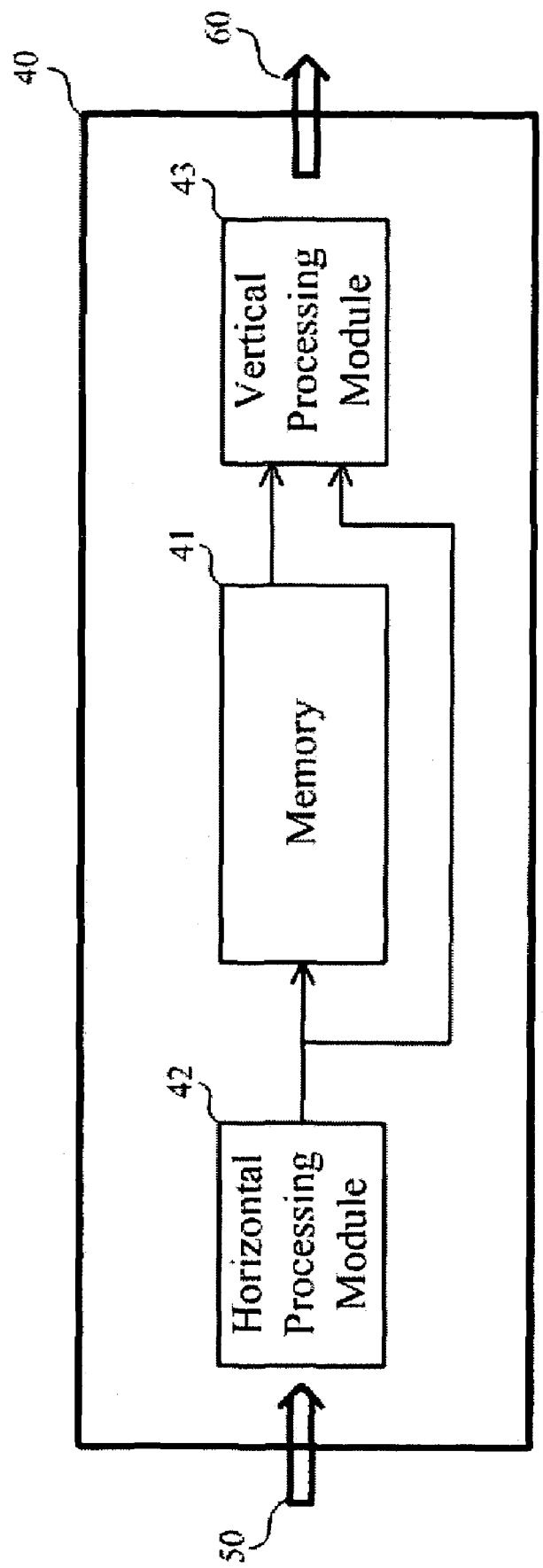
FIG. 4 shows the block diagram of the image processing apparatus according to the second preferred embodiment of this invention.

The second preferred embodiment according to this invention is an image processing apparatus. Please refer to FIG. 4. FIG. 4 shows the block diagram of the image processing apparatus 40. The image processing apparatus 40 includes a memory 41, a horizontal processing module 42, and a vertical processing module 43. The labels 50 and 60 respectively represent an original image and a new image.

The horizontal processing module 42 sequentially generates a (2i−1)th row of intermediate data based on the (2i−1)th row of original data among the M rows of original data, stores the (2i−1)th row of intermediate data into the memory, generates a (2i)th row of intermediate data based on the (2i)th row of original data among the M rows of original data, stores the (2i)th row of intermediate data into the memory, generates a (2i+1)th row of intermediate data based on the (2i+1)th row of original data among the M rows of original data, stores the (2i+1)th row of intermediate data into the memory to replace the (2i−1)th row of intermediate data, generates a (2i+2)th row of intermediate data based on the (2i+2)th row of original data among the M rows of original data, and stores the (2i+2)th row of intermediate data into the memory to replace the (2i)th row of intermediate data.

During the process of generating the (2i+1)th row of intermediate data in the horizontal processing module 42, the vertical processing module 43 simultaneously generates the (2j−1)th row of new data among the Q rows of new data based on the (2i−1)th and (2i+1)th rows of intermediate data. Similarly, during the process of generating the (2i+2)th row of intermediate data in the horizontal processing module 42, the vertical processing module 43 simultaneously generates the (2j)th row of new data among the Q rows of new data based on the (2i)th and (2i+2)th rows of intermediate data.

The operation of the image processing apparatus 40 is the same as the flowchart shown in FIG. 2 and FIG. 3. Therefore, the detailed operation is not further described.

Since the method and apparatus according to this invention resize images conformed to Bayer patterns before transforming images into data in a RGB or YUV plane, the amount of data to be processed can be reduced to one third as that of prior arts. Furthermore, the method and apparatus according to this invention use serial interfaces to input the original image and output the new image, respectively. That is to say, the original image is processed row by row. Thus, this invention only needs a memory space enough for storing a few rows of original data. On the contrary, prior arts need a memory space enough for storing the whole original image. Therefore, the cost of hardware in this invention is lower. Besides, since this invention processes the original data row by row, block effect can be prevented.

The advantages of low processing amounts and small memory requirement in this invention is very suitable for image processing systems requiring higher real-time speed and lower image quality, such as webcams.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. In a video processing system, a method for transforming an original image into a new image, the original image and the new image being both conformed with a Bayer pattern, the original image comprising M rows of original data, the new image comprising Q rows of new data, M and Q being positive integers larger than or equal to 1, a memory being previously provided, a first index i being larger than or equal to 1 and smaller than or equal to (M/2−1), a second index j being larger than or equal to 1 and smaller than or equal to (Q/2), said method comprising the steps of:

(a) based on the (2i−1)th row of original data among the M rows of original data, generating a (2i−1)th row of intermediate data and storing the (2i−1)th row of intermediate data into said memory;

(b) based on the (2i)th row of original data among the M rows of original data, generating a (2i)th row of intermediate data and storing the (2i)th row of intermediate data into said memory;

(c) based on the (2i+1)th row of original data among the M rows of original data, generating a (2i+1)th row of intermediate data, during the process of generating the (2i+1)th row of intermediate data, simultaneously generating the (2j−1)th row of new data among the Q rows of new data based on the (2i−1)th and (2i+1)th rows of intermediate data, and storing the (2i+1)th row of intermediate data into said memory to replace the (2i−1)th row of intermediate data; and (d) based on the (2i+2)th row of original data among the M rows of original data, generating a (2i+2)th row of intermediate data, during the process of generating the (2i+2)th row of intermediate data, simultaneously generating the (2j)th row of new data among the Q rows of new data based on the (2i)th and (2i+2)th rows of intermediate data, and storing the (2i+2)th row of intermediate data into said memory to replace the (2i)th row of intermediate data;

whereby, the Q rows of new data in the new image are sequentially generated and the original image is transformed into the new image.

2. The method of claim 1, wherein each row of original data in the original image respectively comprises (2N) original data, N is a positive integer larger than or equal to 1, each odd row among the M rows of original data respectively comprises N first color units and N second color units, and each even row among the M rows of original data respectively comprises N second color units and N third color units.

3. The method of claim 2, wherein each row of intermediate data respectively comprises (2P) intermediate data, P is a positive integer larger than or equal to 1, the row of intermediate data generated based on the odd rows of original data among the M rows of original data respectively comprises P intermediate first color units and P intermediate second color units, and the row of intermediate data generated based on the even rows of original data among the M rows of original data respectively comprises P intermediate second color units and P intermediate third color units.

4. The method of claim 3, wherein each row of new data in the new image respectively comprises (2P) new data, each odd row among the Q rows of new data respectively comprises P new first color units and P new second color units, and each even row among the Q rows of new data respectively comprises P new second color units and P new third color units.

5. The method of claim 4, wherein in step (a), the P intermediate first color units in the (2i−1)th row of intermediate data are generated by interpolation based on the N first color units in the (2i−1)th row of original data, and the P intermediate second color units in the (2i−1)th row of intermediate data are generated by interpolation based on the N second color units in the (2i−1)th row of original data.

6. The method of claim 4, wherein in step (b), the P intermediate second color units in the (2i)th row of intermediate data are generated by interpolation based on the N second color units in the (2i)th row of original data, and the P intermediate third color units in the (2i)th row of intermediate data are generated by interpolation based on the N third color units in the (2i)th row of original data.

7. The method of claim 4, wherein in step (c), the P new first color units in the (2j−1)th row of new data are generated by interpolation based on the P intermediate first color units in the (2i+1)th row of intermediate data and the P intermediate first color units in the (2i−1)th row of intermediate data, and the P new second color units in the (2j−1)th row of new data are generated by interpolation based on the P intermediate second color units in the (2i+1)th row of intermediate data and the P intermediate second color units in the (2i−1)th row of intermediate data.

8. The method of claim 4, wherein in step (d), the P new second color units in the (2j)th row of new data are generated by interpolation based on the P intermediate second color units in the (2i+2)th row of intermediate data and the P intermediate second color units in the (2i)th row of intermediate data, and the P new third color units in the (2j)th row of new data are generated by interpolation based on the P intermediate third color units in the (2i+2)th row of intermediate data and the P intermediate third color units in the (2i)th row of intermediate data.

9. The method of claim 1, wherein the video processing system is a webcam.

10. In a video processing system, an apparatus for transforming an original image into a new image, the original image and the new image being both conformed with a Bayer pattern, the original image comprising M rows of original data, the new image comprising Q rows of new data, M and Q being positive integers larger than or equal to 1, a first index i being larger than or equal to 1 and smaller than or equal to (M/2−1), a second index j being larger than or equal to 1 and smaller than or equal to (Q/2), said apparatus comprising:
  a memory;
  a horizontal processing module for sequentially generating a (2i−1)th row of intermediate data based on the (2i−1)th row of original data among the M rows of original data, storing the (2i−1)th row of intermediate data into said memory, generating a (2i)th row of intermediate data based on the (2i)th row of original data among the M rows of original data, storing the (2i)th row of intermediate data into said memory, generating a (2i+1)th row of intermediate data based on the (2i+1)th row of original data among the M rows of original data, storing the (2i+1)th row of intermediate data into said memory to replace the (2i−1)th row of intermediate data, generating a (2i+2)th row of intermediate data based on the (2i+2)th row of original data among the M rows of original data, and storing the (2i+2)th row of intermediate data into said memory to replace the (2i)th row of intermediate data; and
  a vertical processing module, during the process of generating the (2i+1)th row of intermediate data in the horizontal processing module, the vertical processing module simultaneously generating the (2j−1)th row of new data among the Q rows of new data based on the (2i−1)th and (2i+1)th rows of intermediate data, and during the process of generating the (2i+2)th row of intermediate data in the horizontal processing module, the vertical processing module simultaneously generating the (2j)th row of new data among the Q rows of new data based on the (2i)th and (2i+2)th rows of intermediate data.

11. The apparatus of claim 10, wherein each row of original data in the original image respectively comprises (2N) original data, N is a positive integer larger than or equal to 1, each odd row among the M rows of original data respectively comprises N first color units and N second color units, and each even row among the M rows of original data respectively comprises N second color units and N third color units.

12. The apparatus of claim 11, wherein each row of intermediate data respectively comprises (2P) intermediate data, P is a positive integer larger than or equal to 1, the row of intermediate data generated based on the odd rows of original data among the M rows of original data respectively comprises P intermediate first color units and P intermediate second color units, and the row of intermediate data generated based on the even rows of original data among the M rows of original data respectively comprises P intermediate second color units and P intermediate third color units.

13. The apparatus of claim 12, wherein each row of new data in the new image respectively comprises (2P) new data, each odd row among the Q rows of new data respectively comprises P new first color units and P new second color units, and each even row among the Q rows of new data respectively comprises P new second color units and P new third color units.

14. The apparatus of claim 13, wherein in the horizontal processing module, the P intermediate first color units in the (2i−1)th row of intermediate data are generated by interpolation based on the N first color units in the (2i−1)th row of original data, and the P intermediate second color units in the (2i−1)th row of intermediate data are generated by interpolation based on the N second color units in the (2i−1)th row of original data.

15. The apparatus of claim 13, wherein in the horizontal processing module, the P intermediate second color units in the (2i)th row of intermediate data are generated by interpolation based on the N second color units in the (2i)th row of original data, and the P intermediate third color units in the (2i)th row of intermediate data are generated by interpolation based on the N third color units in the (2i)th row of original data.

16. The apparatus of claim 13, wherein in the vertical processing module, the P new first color units in the (2j−1)th row of new data are generated by interpolation based on the P intermediate first color units in the (2i+1)th row of intermediate data and the P intermediate first color units in the (2i−1)th row of intermediate data, and the P new second color units in the (2j−1)th row of new data are generated by interpolation based on the P intermediate second color units in the (2i+1)th row of intermediate data and the P intermediate second color units in the (2i−1)th row of intermediate data.

17. The apparatus of claim 13, wherein in the vertical processing module, the P new second color units in the (2j)th row of new data are generated by interpolation based on the P intermediate second color units in the (2i+2)th row of intermediate data and the P intermediate second color units in the (2i)th row of intermediate data, and the P new third color units in the (2j)th row of new data are generated by interpolation based on the P intermediate third color units in the (2i+2)th row of intermediate data and the P intermediate third color units in the (2i)th row of intermediate data.

18. The apparatus of claim 10, wherein the video processing system is a webcam.

* * * * *